US012043512B2

(12) United States Patent
Tanaka

(10) Patent No.: US 12,043,512 B2
(45) Date of Patent: Jul. 23, 2024

(54) IMAGE FORMING APPARATUS AND SHEET CONVEYING METHOD

(71) Applicant: TOSHIBA TEC KABUSHIKI KAISHA, Tokyo (JP)

(72) Inventor: Norio Tanaka, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/949,170

(22) Filed: Sep. 20, 2022

(65) Prior Publication Data

US 2023/0016606 A1 Jan. 19, 2023

Related U.S. Application Data

(63) Continuation of application No. 16/566,687, filed on Sep. 10, 2019, now Pat. No. 11,479,427.

(51) Int. Cl.

| | |
|---|---|
| ***B65H 7/18*** | (2006.01) |
| ***B65H 1/26*** | (2006.01) |
| ***B65H 7/06*** | (2006.01) |
| ***B65H 7/20*** | (2006.01) |
| ***G03G 15/00*** | (2006.01) |

(52) U.S. Cl.
CPC ............... *B65H 7/06* (2013.01); *B65H 1/266* (2013.01); *B65H 7/18* (2013.01); *B65H 7/20* (2013.01); *G03G 15/6529* (2013.01)

(58) Field of Classification Search
CPC ... B65H 7/06; B65H 7/18; B65H 7/20; B65H 7/12; B65H 7/125; B65H 1/266; B65H 1/04; B65H 2511/529; B65H 2511/528; G03G 15/6529; G03G 15/502
See application file for complete search history.

(56) References Cited

U.S. PATENT DOCUMENTS

| | | | |
|---|---|---|---|
| 2013/0272725 | A1 | 10/2013 | Tanaka |
| 2016/0378043 | A1 | 12/2016 | Isobe et al. |
| 2018/0246460 | A1 | 8/2018 | Sugano |

FOREIGN PATENT DOCUMENTS

| | | | |
|---|---|---|---|
| JP | 2012183686 | A | 9/2012 |

*Primary Examiner* — Luis A Gonzalez
(74) *Attorney, Agent, or Firm* — Kim & Stewart LLP

(57) ABSTRACT

An image forming apparatus includes a sheet storage unit including a sheet tray on which one or more sheets are to be stacked, a sensor configured to detect that the sheet storage unit is being operated, and a processor configured to execute a predetermined process after the sensor detects that the sheet storage unit has been operated, and a predetermined condition relating to an occurrence of the sheet conveyance error is satisfied.

19 Claims, 5 Drawing Sheets

IMAGE FORMING APPARATUS AND SHEET CONVEYING METHOD

CROSS-REFERENCE TO RELATED APPLICATIONS

This application is a continuation of U.S. patent application Ser. No. 16/566,687, filed Sep. 10, 2019, the entire contents of which are incorporated herein by reference.

FIELD

Embodiments described herein relate generally to an image forming apparatus and a sheet conveying method.

BACKGROUND

A sheet conveyance error occurs for various reasons in an image forming apparatus. One cause of the sheet conveyance error is that a sheet is not properly stored in a sheet storage unit. For example, in the image forming apparatus, when a side guide provided in the sheet storage unit presses the sheet strongly, it may not be possible to pick up the sheet. On the other hand, when the sheet is not sufficiently pressed due to looseness of the side guide of the image forming apparatus, a sheet conveyance error such as the sheet jamming caused by sheet skew may occur. It is difficult for a user or a service person to determine whether the sheet is properly stored in the sheet storage unit, and the user or the service person may not notice the cause of the sheet conveyance error. When there is a plurality of sheet storage units, it is difficult to determine which of the sheet storage units has the side guide member that is positioned improperly. Accordingly, the user or the service person cannot properly specify the cause of the sheet conveyance error, so it may be difficult to take appropriate measures to prevent further occurrence of the sheet conveyance error.

DETAILED DESCRIPTION

In general, according to one embodiment, an image forming apparatus includes a sheet storage unit including a sheet tray on which one or more sheets are to be stacked, a sensor configured to detect that the sheet storage unit is being operated, and a processor configured to execute a predetermined process after the sensor detects that the sheet storage unit has been operated, and a predetermined condition relating to an occurrence of the sheet conveyance error is satisfied.

Figure 1:
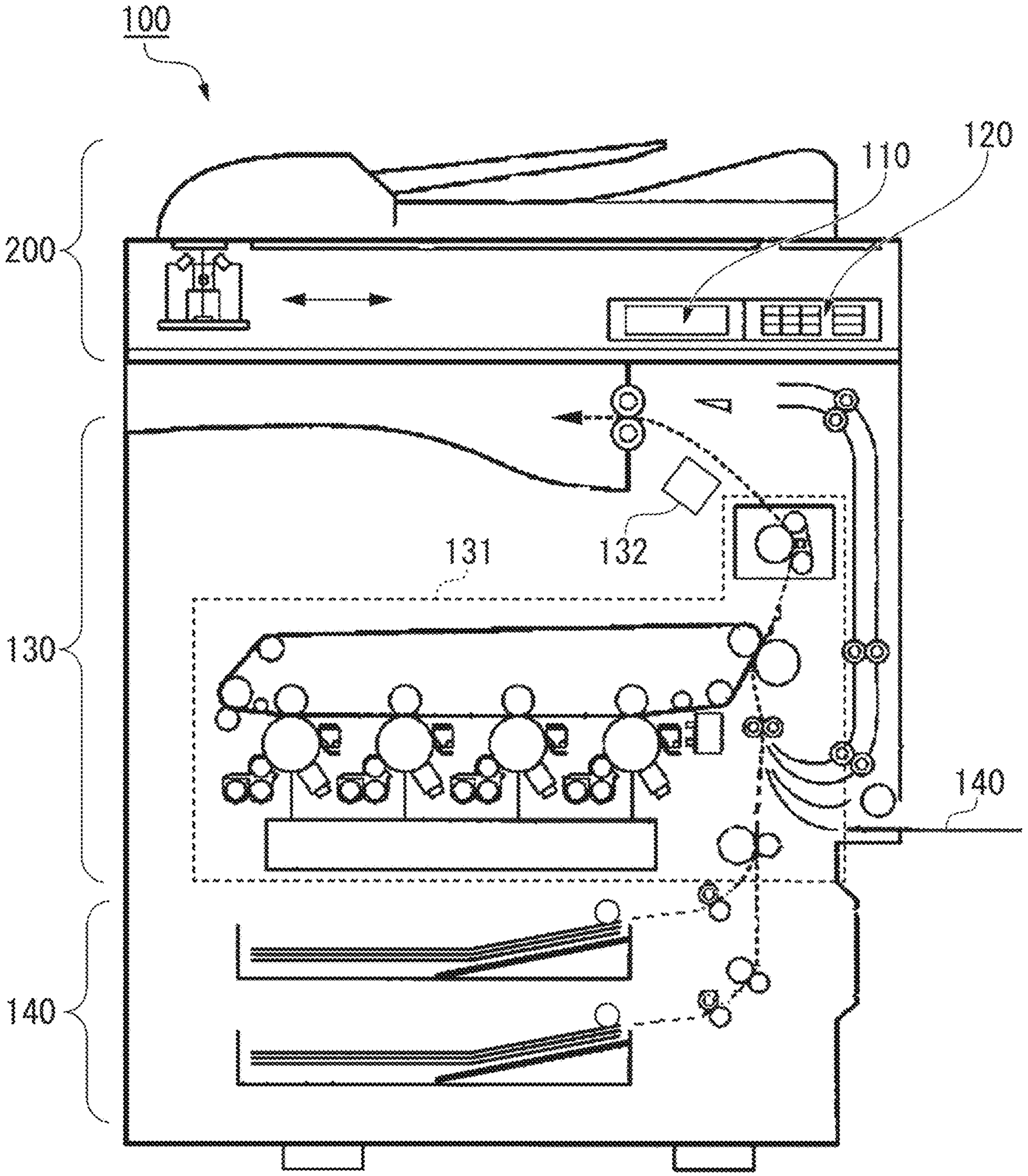
FIG. 1 is an external view illustrating an example of the overall configuration of an image forming apparatus according to an embodiment.

FIG. 1 is an external view illustrating an example of the overall configuration of an image forming apparatus 100 according to an embodiment. The image forming apparatus 100 is, for example, a multifunction peripheral. The image forming apparatus 100 includes a display 110, a control panel 120, an image processing unit 130, a sheet storage unit 140, and an image reading unit 200. The image processing unit 130 of the image forming apparatus 100 includes a printer 131 which may be an electrophotographic device for fixing toner images or an inkjet device. The image processing unit 130 may be a scanner 132 which reads an image formed on a sheet.

The image forming apparatus 100 forms an image on a sheet using a developer such as toner. The sheet is, for example, paper or label paper. The sheet may be made of any material as long as the image forming apparatus 100 can form an image on the surface thereof.

The display 110 is an image display device such as a liquid crystal display, an organic electro luminescence (EL) display, and the like. The display 110 displays various kinds of information relating to the image forming apparatus 100.

The control panel 120 includes a plurality of buttons. The control panel 120 receives an operation of a user. The control panel 120 outputs a signal according to an input made thereon by the user to a control unit of the image forming apparatus 100. The display 110 and the control panel 120 may be formed integrally as a touch panel.

The image processing unit 130 forms an image on the sheet based on image information generated by the image reading unit 200 or image information received via a communication network. The image processing unit 130 forms an image through the following processes, for example. An image forming unit of the image processing unit 130 forms an electrostatic latent image on a photosensitive drum based on the image information. The image forming unit of the image processing unit 130 forms a visible image by applying developer to the electrostatic latent image. A specific example of the developer is toner. A transfer unit of the image processing unit 130 transfers the visible image on the sheet. A fixing unit of the image processing unit 130 fixes the visible image on the sheet by heating and pressing the sheet. A sheet conveying unit of the image processing unit 130 conveys the sheet stored in the sheet storage unit 140 along a conveyance path using a conveyance roller and the like. The sheet on which an image is formed may be a sheet stored in a sheet cassette of the sheet storage unit 140 or a sheet manually fed from a manual feed tray of the sheet storage unit 140. A reading unit of the image processing unit 130 may include the scanner 132 such as a charge coupled device (CCD) sensor. In this case, the scanner 132 reads an image formed on the sheet stored in the sheet storage unit 140 or the sheet manually fed from the manual feed tray. The read image information is stored in a storage device.

The sheet storage unit 140 stores sheets used for image forming or image reading in the image processing unit 130.

The image reading unit 200 generates image information based on lightness and darkness of a reading target. The image reading unit 200 records the read image information. The recorded image information may be transmitted to another information processing device via a network. The recorded image information may be formed as an image on the sheet by the image processing unit 130.

Figure 2:
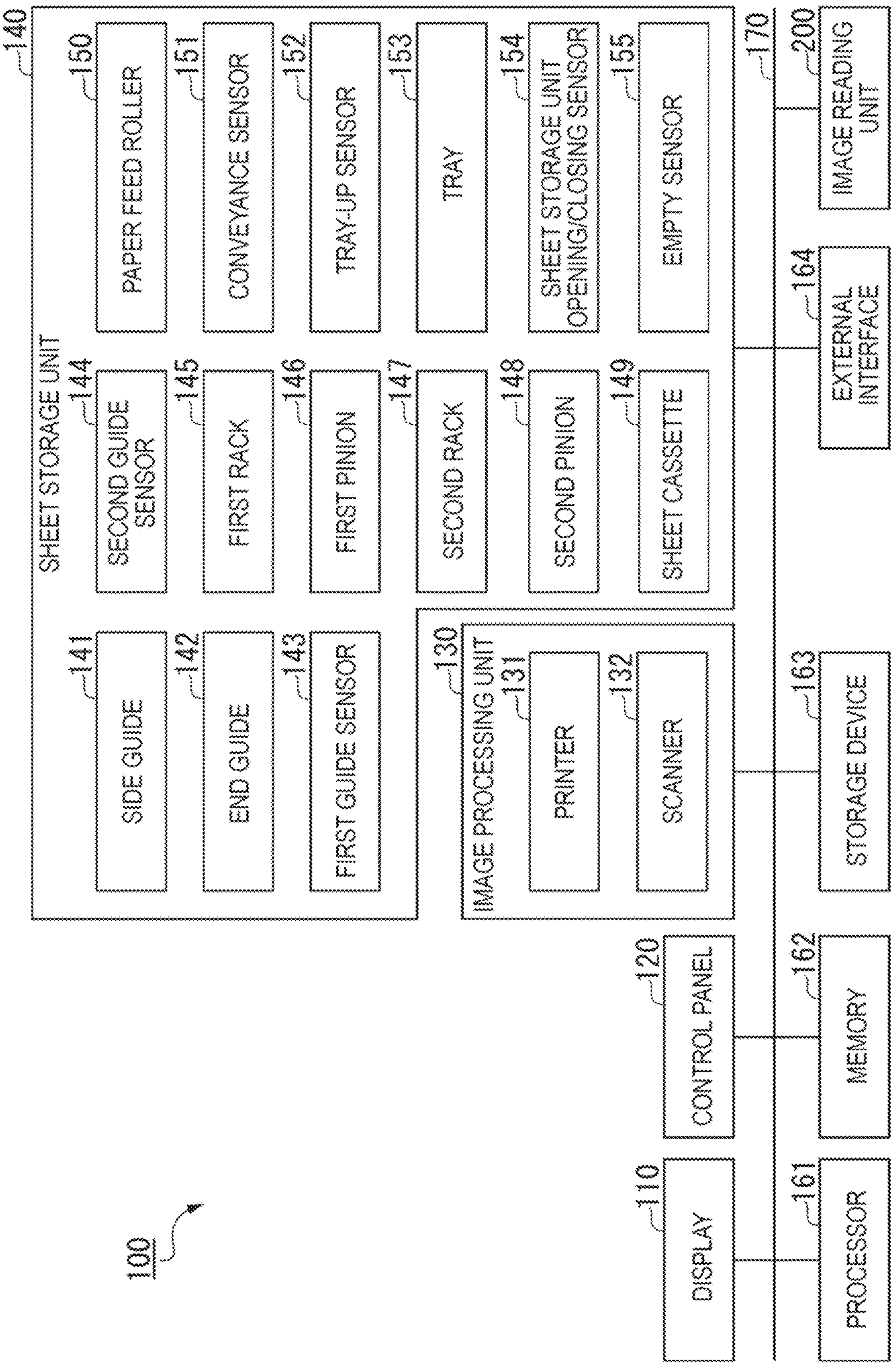
FIG. 2 is a block diagram illustrating a hardware configuration of the image forming apparatus.

FIG. 2 is a block diagram illustrating a hardware configuration of the image forming apparatus 100 according to the embodiment. The image forming apparatus 100 includes the display 110, the control panel 120, the image processing unit 130, the sheet storage unit 140, a processor 161, a memory 162, a storage device 163, an external interface 164, and the image reading unit 200. The display 110, the control panel 120, the image processing unit 130, and the image reading unit 200 are already described above, and thus the description thereof will not be repeated. Hereinafter, the description will be given on the sheet storage unit 140, the processor 161, the memory 162, the storage device 163, and the external interface 164. Each component is connected to each other to be capable of data communication via a system bus 170.

The sheet storage unit 140 is provided in plural. Each sheet storage unit 140 includes side guides 141, an end guide 142, a first guide sensor 143, a second guide sensor 144, a first rack 145, a first pinion 146, a second rack 147, a second pinion 148, a sheet cassette 149, a paper feed roller 150, a conveyance sensor 151, a tray-up sensor 152, a tray 153, a sheet storage unit opening/closing sensor 154, and an empty sensor 155. The first guide sensor 143 and the second guide sensor 144 each utilize an encoder and detect a position or movement of the side guide 141 and the end guide 142 provided in the sheet storage unit 140, respectively. The side guide 141 is a plate-shaped member for aligning sheets stored in the sheet storage unit 140 in a direction orthogonal to a sheet conveyance direction. Each side guide 141 is provided with the first rack 145. The first rack 145 of the side guide 141 engages with the first pinion 146, and the two facing side guides 141 move in unison with each other. The end guide 142 is a plate-shaped member for aligning end portions of the sheets stored in sheet storage unit 140 in the sheet conveyance direction. The end guide 142 is provided with the second rack 147, and the second rack 147 engages with the second pinion 148. A plurality of holes are provided in the first pinion 146 and the second pinion 148 along a circumferential direction. The first guide sensor 143 is provided at a position where the hole of the first pinion 146 can be detected, and detects and outputs movement of the first pinion 146. The second guide sensor 144 is provided at a position where the hole of the second pinion 148 can be detected, and detects and outputs movement of the second pinion 148. Accordingly, the processor 161 can determine the position or movement of the side guide 141 and the end guide 142.

The paper feed roller 150 feeds the sheets from the sheet storage unit 140 one by one toward the conveyance roller. The paper feed roller 150 feeds the sheets stored in the sheet storage unit 140 to the image processing unit 130. The conveyance sensor 151 detects the sheet fed from the sheet storage unit 140 to the image processing unit 130. The tray-up sensor 152 detects that the tray 153 for stacking sheets rises. The sheet storage unit opening/closing sensor 154 detects that the sheet storage unit 140 is pulled out from and/or mounted to the image forming apparatus 100. The empty sensor 155 detects that sheets are stored in the sheet storage unit 140.

The processor 161 controls the operation of each component of the image forming apparatus 100. The processor 161 loads a software program stored in the storage device 163 in the memory 162 and executes the software program, thereby executing various processes described herein. Here, specific processes executed by the processor 161 will be described by way of examples. The processor 161 counts the number of fed sheets which indicates the number of sheets conveyed from the sheet storage unit 140 and the number of times by which the sheet conveyance error occurs. The sheet conveyance error may correspond to a sheet jam inside the image forming apparatus 100, a stoppage of the sheet conveyance during the sheet conveyance inside the image forming apparatus 100, and a failure to pick up the sheet stored in the sheet storage unit 140. The processor 161 calculates an occurrence frequency of sheet conveyance errors by dividing the number of occurrences of the sheet conveyance errors by the number of fed sheets at the timing when an operation is performed on the sheet storage unit 140. The operation on the sheet storage unit 140 may be, for example, an operation of opening the sheet storage unit 140 (operation of pulling out the sheet storage unit 140 from the image forming apparatus 100), an operation of closing the sheet storage unit 140 (operation of mounting the sheet storage unit 140 to the image forming apparatus 100), or an operation of moving the side guide 141 or the end guide 142 of the sheet storage unit 140. The processor 161 records the calculated occurrence frequency of the sheet conveyance errors in the storage device 163 when any of the above-described operation is performed on the sheet storage unit 140, and then sets the counted number of occurrences of the sheet conveyance errors and the counted number of fed sheets to 0.

The memory 162 temporarily stores data used by each component of the image forming apparatus 100. The memory 162 is, for example, a random access memory (RAM). The memory 162 may store data generated by the image reading unit 200 or the scanner 132. The memory 162 also may temporarily store either the counted number of occurrences of the sheet conveyance errors or the counted number of fed sheets.

The storage device 163 is, for example, a hard disk or a solid state drive (SSD), and stores various kinds of data. The various kinds of data are, for example, the occurrence frequency of the sheet conveyance errors or the image displayed on the display 110. The storage device 163 stores the occurrence frequency of the sheet conveyance errors respectively associated with the plurality of the sheet storage units 140.

The external interface 164 transmits and receives data to and from other devices. Here, other devices are, for example, a device such as an information processing device which transmits a printing job. The printing job causes the image forming apparatus 100 to perform printing of the image data specified in the printing job. The external interface 164 operates as an input interface to receive data or instructions from other devices. An instruction transmitted from other devices include a printing execution instruction, a storage instruction of image information, and the like. The external interface 164 operates as an output interface to transmit data to other devices.

Figure 3:
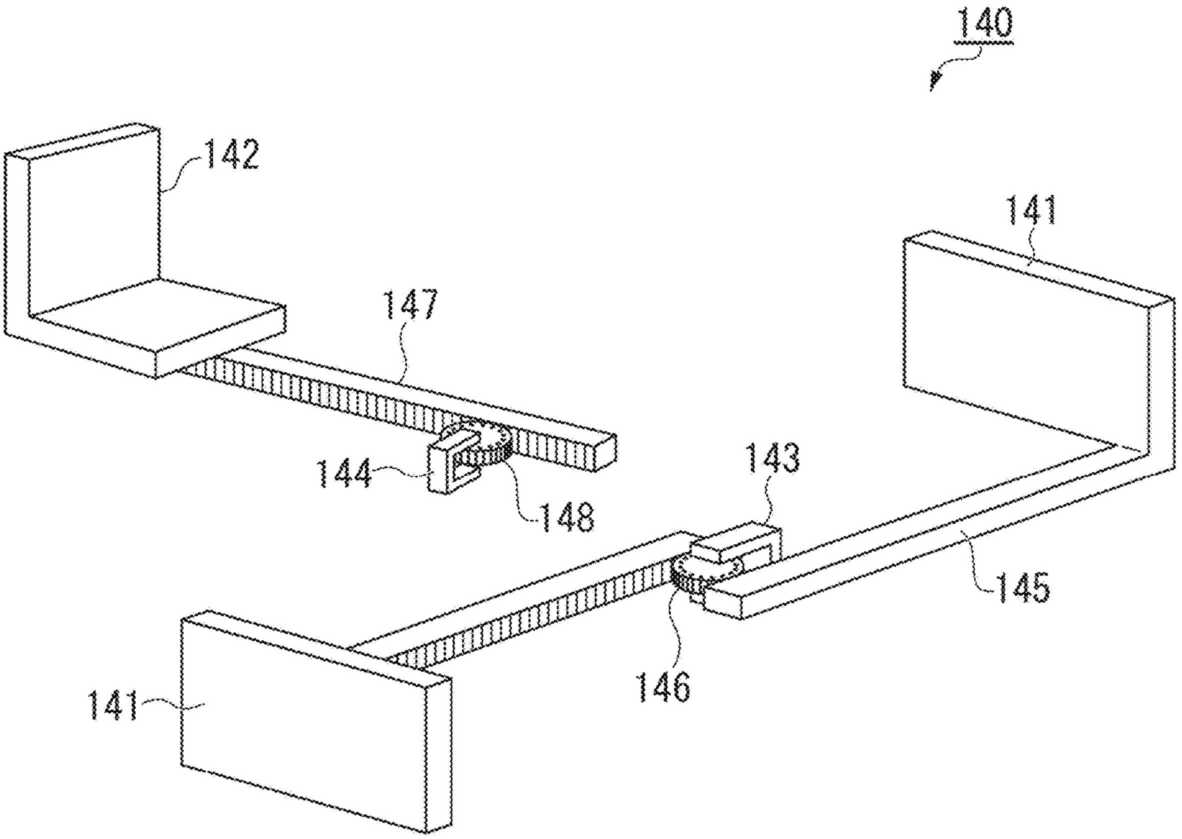
FIG. 3 is a view illustrating side guides, an end guide, a first guide sensor, and a second guide sensor in a sheet storage unit.

FIG. 3 is a view illustrating the side guides 141, the end guide 142, the first guide sensor 143, and the second guide sensor 144 in the sheet storage unit 140 according to the embodiment. The side guide 141 is provided with the first rack 145, and the first rack 145 and the first pinion 146 engage with each other. The first rack 145 and the first pinion 146 move in conjunction with the movement of the side guides 141, and the first guide sensor 143 detects the movement of the first pinion 146. The first guide sensor 143 detects the movement of the first pinion 146, and thus a signal according to the position or movement of the side guide 141 is outputted to the processor 161.

The end guide 142 is provided with the second rack 147, and the second rack 147 and the second pinion 148 engage with each other. The second rack 147 and the second pinion 148 move in conjunction with the movement of the end guide 142, and the second guide sensor 144 detects the movement of the second pinion 148. The second guide sensor 144 detects the movement of the second pinion 148, and thus a signal according to the position or movement of the end guide 142 is outputted to the processor 161.

Figure 4:
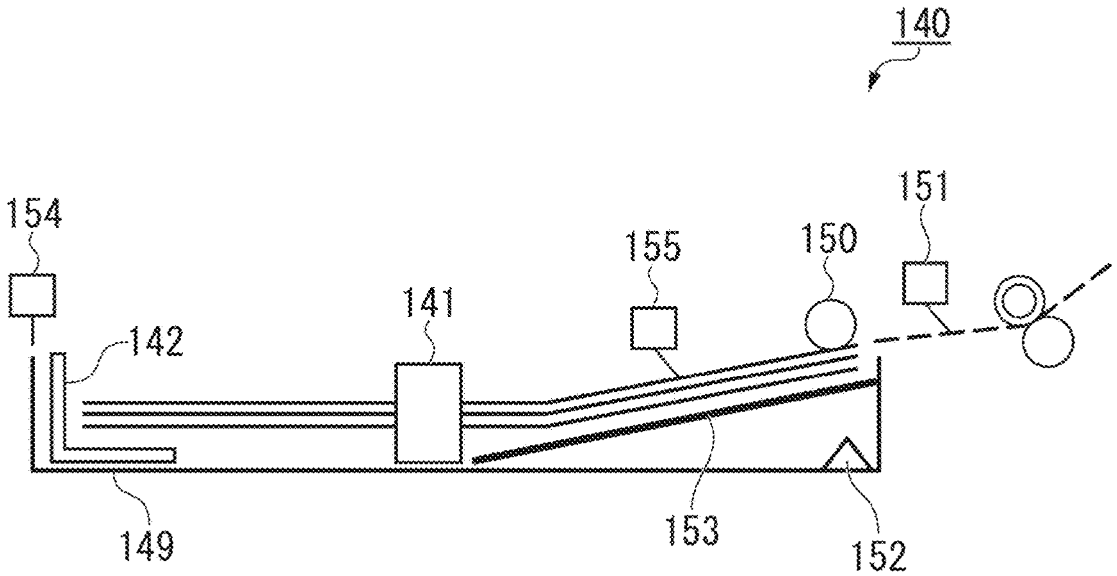
FIG. 4 is a view illustrating a paper feed roller and each sensor in the sheet storage unit.

FIG. 4 is a view illustrating the paper feed roller 150 and each sensor in the sheet storage unit 140 according to the embodiment. The paper feed roller 150 is provided on the downstream side of the sheet cassette 149 in the sheet conveyance direction. The paper feed roller 150 nips the sheet using a separation pad (not illustrated) and rotates, thereby feeding the sheet to the image processing unit 130.

The conveyance sensor 151 is a contact sensor that detects the sheet when a contact is made between a sensing member included in the sheet conveyance sensor 151 and the conveyed sheet. When the sheet conveyed by the paper feed roller 150 is detected, the conveyance sensor 151 outputs a signal indicating that the sheet is conveyed, to the processor 161.

The tray-up sensor 152 detects the rise of the tray when there is separation between the tray 153 with sheets stacked thereon and a sensing member included in the tray-up sensor 152. When the rise of the tray 153 with sheets stacked thereon is detected, the tray-up sensor 152 outputs a signal indicating that the tray 153 with sheets stacked thereon has risen, to the processor 161.

The sheet storage unit opening/closing sensor 154 detects an opening or closing of the sheet storage unit 140 when there is separation or contact between the sheet storage unit 140 and a sensing member included in the sheet storage unit opening/closing sensor 154. When it is detected that the sheet storage unit 140 has been opened or closed, the sheet storage unit opening/closing sensor 154 outputs a signal indicating that the sheet storage unit 140 has been opened or closed, to the processor 161.

The empty sensor 155 is a contact sensor that detects that the sheets are stored in the sheet storage unit 140 when there is contact between a sensing member included in the empty sensor 155 and a sheet stored in the sheet storage unit 140. When it is detected that the sheets are stored in the sheet storage unit 140, the empty sensor 155 outputs a signal indicating that the sheets are stored, to the processor 161.

Figure 5:
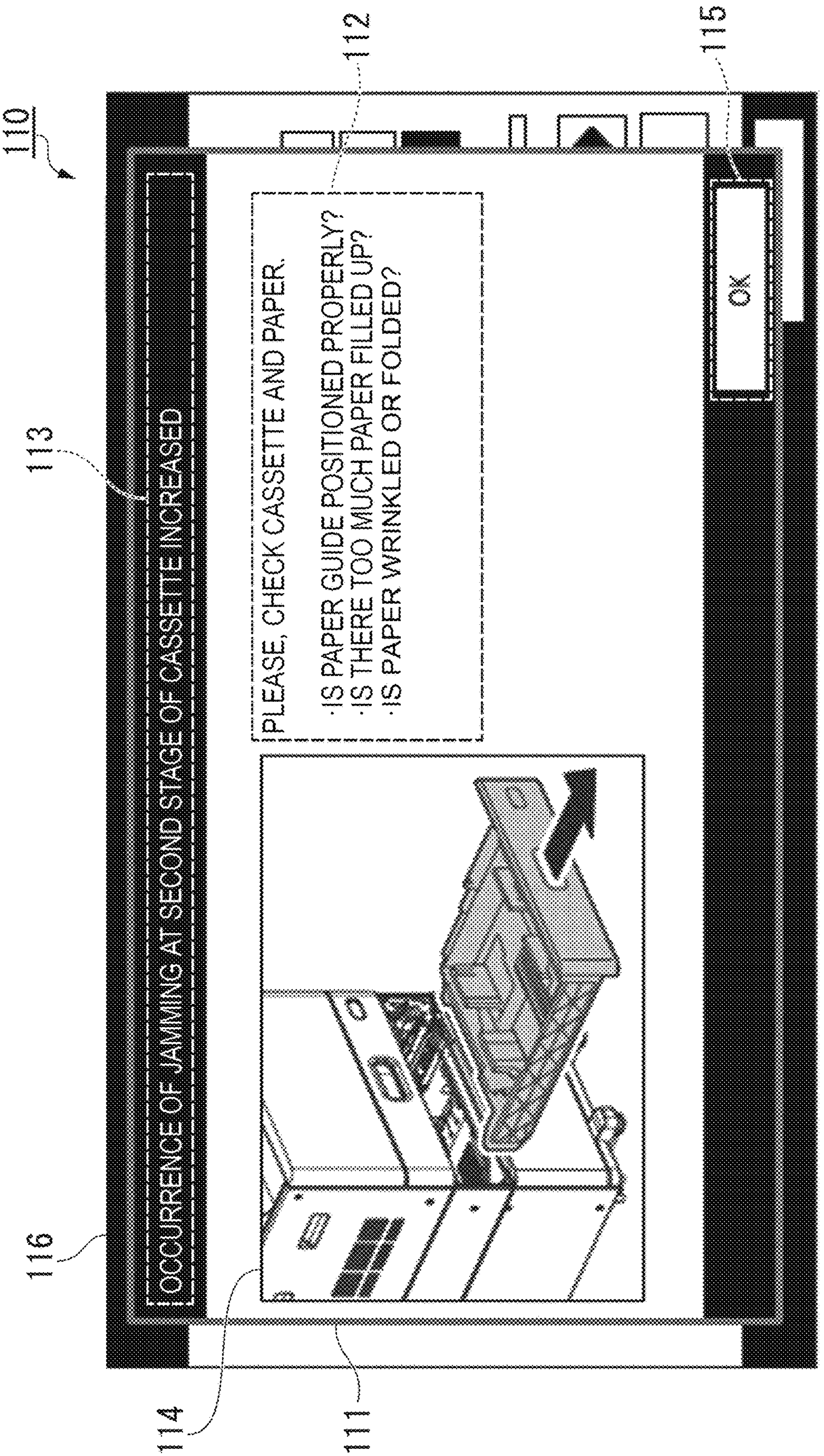
FIG. 5 is a view illustrating a specific example of a display that provides a visual guide on how to remove a cause of a sheet conveyance error.

FIG. 5 is a view illustrating a specific example of a display that provides a visual guide 111 on how to remove a cause of a sheet conveyance error, according to the embodiment. The visual guide 111 is displayed on the display 110. The visual guide 111 includes a notification area 112, a title area 113, an image area 114, and a confirmation area 115. The cause of the sheet conveyance error represents an event that causes a sheet conveyance error. The cause of the sheet conveyance error may be, for example, the number of sheets stored in the sheet storage unit 140 exceeds the capacity of the sheet storage unit 140, and the side guide 141 provided in the sheet storage unit 140 is not set to a proper position.

The notification area 112 is an area where a character string is displayed to notify the user of a method of eliminating the cause of the sheet conveyance error. The user can try to eliminate the cause of the sheet conveyance error by following the directions contained in the character string displayed on the notification area 112. The character string to be displayed on the notification area 112 may vary depending on a state detected by the respective sensors. For example, when the position of the end guide 142 detected by the second guide sensor 144 does not fit the size of the stored sheet, the processor 161 may display a character string of "•IS PAPER GUIDE POSITIONED PROPERLY?" When the rise of the tray cannot be detected by the tray-up sensor 152, the processor 161 may display a character string of "•IS THERE TOO MUCH PAPER IN THE TRAY?" When the conveyance time of the sheet detected by the conveyance sensor 151 is shorter than a predetermined time, the processor 161 may display a character string of "•IS PAPER WRINKLED OR RIPPED?"

The title area 113 is an area where the title of the visual guide 111 is displayed. On the title area 113, a character string is displayed to identify the sheet storage unit 140 that may be causing the sheet conveyance errors. For example, on the title area 113, a character string is displayed by which the sheet storage unit at the second stage of the cassette can be identified among the plurality of sheet storage units 140, e.g., with a character string of "OCCURRENCE OF JAMMING AT SECOND STAGE OF CASSETTE INCREASED." Here, on the title area 113, a sheet storage unit 140 associated with the occurrence frequency of the sheet conveyance error satisfying a predetermined condition among the occurrence frequencies of the plurality of sheet conveyance errors stored in the storage device 163 is displayed. The predetermined condition may include, for example, a case where the difference value between the occurrence frequency of the sheet conveyance error and a predetermined frequency is larger than a threshold or a case where the occurrence frequency of the sheet conveyance error is higher than a threshold. The predetermined condition may be any condition as long as the condition relates to the occurrence frequency of the sheet conveyance error. The user can eliminate the cause of the sheet conveyance error of the sheet storage unit 140 at the second stage based on the character string displayed on the title area 113. In the example given herein, the sheet storage unit 140 is the cassette.

The image area 114 is an area where an image is displayed which illustrates a method of eliminating the cause of the sheet conveyance error and a location of the sheet storage unit 140. In the example given herein, the user can know that the cause of the sheet conveyance error is in the sheet storage unit 140 at the second stage, based on the image displayed on the image area 114.

The confirmation area 115 is an area where the image of an "OK" button is displayed. The user can erase the visual guide 111 from the display 110 by clicking the "OK" button image. As illustrated in FIG. 5, the visual guide 111 may be displayed so as to be superimposed on a predetermined image 116. The predetermined image 116 may be an image of a user interface by which an instruction to be transmitted to the image forming apparatus 100 is input.

Figure 6:
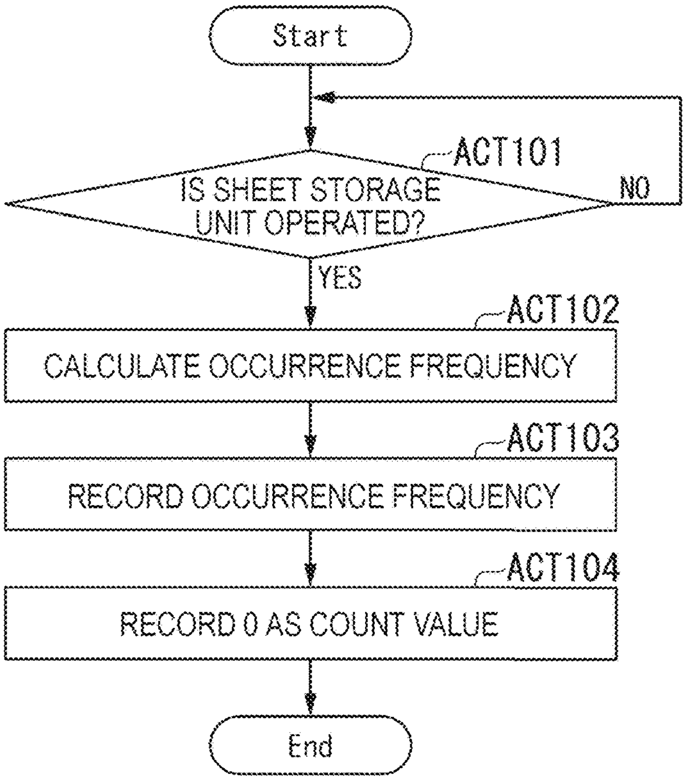
FIG. 6 is a flowchart illustrating a method of calculating and recording the occurrence frequency of the sheet conveyance errors and then resetting the count of sheet conveyance errors to zero, when the sheet storage unit is operated.

FIG. 6 is a flowchart illustrating a method of calculating and recording the occurrence frequency of the sheet conveyance errors, according to the embodiment. The initialization of the number of occurrences of the sheet conveyance errors is executed when the sheet storage unit 140 is operated. The processor 161 of the image forming apparatus 100 determines whether the sheet storage unit 140 is being operated (ACT 101). Specifically, the processor 161 determines whether the sheet storage unit 140 is operated based on a signal outputted from a predetermined sensor. The predetermined sensor may be, for example, the first guide sensor 143 or the second guide sensor 144, the conveyance sensor 151, the tray-up sensor 152, the sheet storage unit opening/closing sensor 154, or the empty sensor 155. For example, when receiving a signal indicating that the end guide 142 is moved from the second guide sensor 144, the processor 161 may determine that the sheet storage unit 140 is operated. When receiving a signal indicating that the tray with sheets mounted thereon dose not rise from the tray-up sensor 152, for example, the processor 161 may determine that the sheet storage unit 140 is operated. When receiving a signal indicating that there are sheets stored in the tray from the empty sensor 155, for example, the processor 161 may determine that the sheet storage unit 140 is operated. When receiving a signal indicating that the sheet storage unit is pulled out from or mounted to the image forming apparatus 100 from the sheet storage unit opening/closing sensor 154, for example, the processor 161 may determine that the sheet storage unit 140 is operated. The processor 161 may perform determination using any signal as long as the signal is outputted according to the operation of the sheet storage unit 140.

When the sheet storage unit 140 is not operated (ACT 101: NO), the process goes to ACT 101. When the sheet storage unit 140 is operated (ACT 101: YES), the processor 161 calculates the occurrence frequency of the sheet conveyance errors (ACT 102). Specifically, the processor 161 obtains the number of fed sheets at a time the sheet storage unit 140 is operated, from the storage device 163. The processor 161 also obtains the number of occurrences of the sheet conveyance errors at such a time from the storage device 163. The processor 161 calculates the occurrence frequency of the sheet conveyance error by dividing the obtained number of occurrences of the sheet conveyance errors by the obtained number of fed sheets.

The processor 161 records the calculated occurrence frequency of the sheet conveyance error (ACT 103). Specifically, the processor 161 records the calculated occurrence frequency of the sheet conveyance error in the storage device 163. The processor 161 may record the operated sheet storage unit 140 and the occurrence frequency of the sheet conveyance error in association with each other. The processor 161 may record the occurrence frequency of the sheet conveyance error and the characteristics of the sheets stored in the sheet storage unit 140 in association with each other. The characteristics of the sheet may be, for example, plain paper, thick paper, or label paper, or may be the size of a sheet such as A4 or A3. The processor 161 may record a plurality of occurrence frequencies of the sheet conveyance error in the storage device 163.

The processor 161 stores the occurrence frequency of the sheet conveyance error, and then resets the number of occurrences of the sheet conveyance error and the number of fed sheets to 0 (ACT 104). Specifically, the processor 161 records 0 in the storage device 163 as the counted value of the number of occurrences of the sheet conveyance error. The processor 161 records 0 in the storage device 163 as the counted value of the number of fed sheets.

Figure 7:
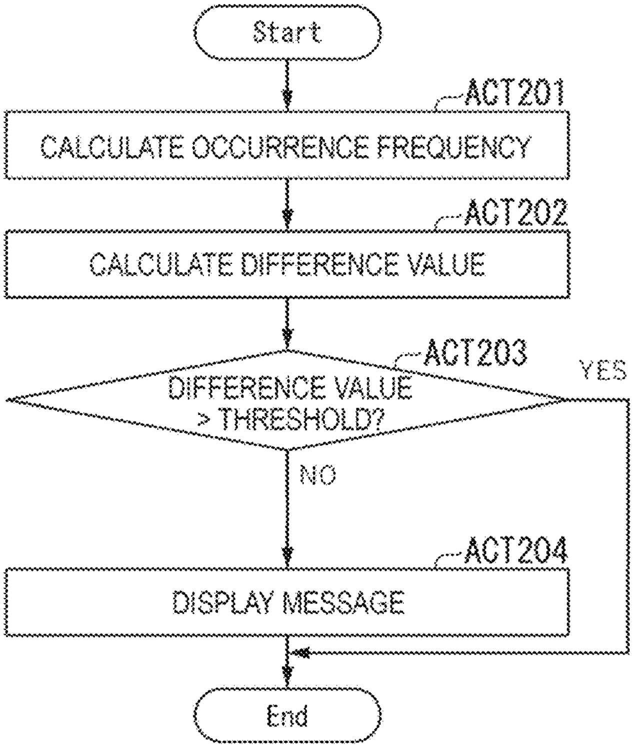
FIG. 7 is a flowchart illustrating a method of determining whether or not to display the visual guide.

FIG. 7 is a method of determining whether or not to display the visual guide, according to the embodiment. The determination to display the visual guide may be executed when the sheet conveyance error occurs or when the printing is ended. Hereinafter, the processing to be executed when the sheet conveyance error occurs will be described. The processor 161 calculates the occurrence frequency of the sheet conveyance error (ACT 201). Specifically, the processor 161 obtains the number of fed sheets of the sheet storage unit 140 where the sheet conveyance error occurs from the storage device 163. The processor 161 obtains the number of occurrences of the sheet conveyance errors of the sheet storage unit 140 where the sheet conveyance error occurs from the storage device 163. The processor 161 calculates the occurrence frequency of the sheet conveyance error by dividing the obtained number of occurrences of the sheet conveyance errors by the obtained number of fed sheets.

The processor 161 calculates the difference value between the calculated occurrence frequency of the sheet conveyance error and a predetermined frequency (ACT 202). Specifically, the processor 161 determines the predetermined frequency by retrieving the occurrence frequency of the sheet conveyance error from the storage device 163. The retrieved occurrence frequency of the sheet conveyance error is the occurrence frequency of the sheet conveyance error calculated in the flowchart illustrated in FIG. 6. The predetermined occurrence frequency of the sheet conveyance error may be, for example, the occurrence frequency of the sheet conveyance error calculated at a time when the sheet storage unit 140, in which the sheet conveyance error occurs, was last operated. In this case, the processor 161 sets the retrieved occurrence frequency of the sheet conveyance error to be the predetermined frequency. The predetermined frequency also may be a statistical value calculated based on a plurality of the occurrence frequencies of the plurality of sheet conveyance errors stored in the storage device 163. The statistical value may be, for example, an average value, a maximum value, a minimum value, or any value as long as the value is obtained through statistics. The processor 161 calculates the difference value between the occurrence frequency of the sheet conveyance error calculated in ACT 201 and the predetermined frequency.

The processor 161 compares the calculated difference value and a threshold (ACT 203). Specifically, the processor 161 obtains the threshold from the storage device 163. The processor 161 determines whether the calculated difference value is larger than the obtained threshold. As the predetermined threshold, different thresholds may be used depending on the characteristics of the sheet.

When the calculated difference value is larger than the obtained threshold indicating that the calculated occurrence frequency of the sheet conveyance error is much smaller than the predetermined frequency of sheet conveyance error (ACT 203: YES), the processor 161 ends the process. When the calculated difference value is not larger than the obtained threshold indicating that the calculated occurrence frequency of the sheet conveyance error is near the predetermined frequency of sheet conveyance error (ACT 203: NO), the processor 161 displays a visual guide on the display 110 (ACT 204). Specifically, the processor 161 generates a visual guide based on a signal received from each sensor. For example, when the position of the end guide 142 detected by the second guide sensor 144 does not correspond to the size of the stored sheet, the processor 161 may display a visual guide including a character string of "•IS PAPER GUIDE POSITIONED PROPERLY?" When the tray-up sensor 152 detects that the position of the tray 153 does not rise, the processor 161 may display a visual guide including a character string of "•IS THERE TOO MUCH PAPER FILLED UP?" When the detection time of the sheet detected by the conveyance sensor 151 is shorter than a predetermined time, the processor 161 may display a visual guide including a character string of "•IS PAPER WRINKLED OR FOLDED?"

The image forming apparatus 100 configured as above calculates the occurrence frequency of the sheet conveyance error at the timing of the operation of the sheet storage unit 140. When the sheet conveyance error occurs or when the printing ends, the processor 161 calculates the occurrence frequency of the sheet conveyance error. The processor 161 calculates the difference value of the calculated occurrence frequency of the sheet conveyance errors. When the calculated difference value is not larger than the threshold, the processor 161 displays a visual guide on the display 110. Based on the visual guide, the user or the service person can understand that the cause of the sheet conveyance error is in the method of setting the sheet in the sheet storage unit 140. Based on the visual guide, the user or the service person can eliminate the cause of the sheet conveyance error. As described above, the processor 161 displays the visual guide, and thus it is possible to reduce the downtime and the service cost of the image forming apparatus 100.

In the above-described embodiment, the processor 161 calculates the difference value between the occurrence frequency of the sheet conveyance error and a predetermined frequency, and displays a visual guide when the calculated difference value is not larger than a threshold. However, the embodiment is not limited thereto. For example, the processor 161 may use, as a predetermined frequency, a predetermined threshold relating to the occurrence frequency of the sheet conveyance error. In this case, the processor 161 compares the occurrence frequency of the sheet conveyance error and the predetermined threshold to determine whether to display the visual guide on the display 110. For example, when the occurrence frequency of the sheet conveyance error is higher than the predetermined threshold, the processor 161 may display the visual guide on the display 110.

In the embodiment described above, the processor 161 calculates the occurrence frequency of the sheet conveyance error by dividing the number of occurrences of the sheet conveyance errors by the number of fed sheets. However, the method of calculating the occurrence frequency of the sheet conveyance error is not limited thereto. For example, the occurrence frequency of the sheet conveyance error may be calculated by dividing the number of occurrences of the sheet conveyance errors by the number of printing jobs. In this case, the processor 161 counts the number of printing jobs instead of the number of fed sheets. The storage device 163 stores the number of printing jobs instead of the number of fed sheets. Specifically, the processor 161 obtains the number of occurrences of sheet conveyance errors from the storage device 163. The processor 161 obtains the number of printing jobs from the storage device 163. The processor 161 calculates the occurrence frequency of the sheet conveyance error by dividing the obtained number of occurrences of the sheet conveyance errors by the obtained number of printing jobs.

The occurrence frequency of the sheet conveyance error may be calculated by dividing the number of occurrences of the sheet conveyance errors by the number of print copies. In this case, the processor 161 counts the number of print copies instead of the number of fed sheets. The storage device 163 stores the number of print copies instead of the number of fed sheets. Specifically, the processor 161 obtains the number of occurrences of the sheet conveyance errors from the storage device 163. The processor 161 obtains the number of print copies from the storage device 163. The processor 161 divides the obtained number of occurrences of the sheet conveyance errors by the obtained number of print copies to calculate the occurrence frequency of the sheet conveyance error. The occurrence frequency of the sheet conveyance error may be the number of occurrences of the sheet conveyance errors.

The processor 161 may determine whether the stored state of sheets is the cause of the sheet conveyance error based on whether there occurs a sheet conveyance error before a predetermined number of sheets are fed. Specifically, the processor 161 counts the number of fed sheets from the number of times of driving of the paper feed roller 150 or the number of times of output of the conveyance sensor 151. When a sheet conveyance error occurs before the number of fed sheets reaches a predetermined number of sheets, the processor 161 determines that the stored state of the sheets is the cause of the sheet conveyance error. In this case, the processor 161 displays a visual guide on the display 110. When a sheet conveyance error does not occur before the number of fed sheets reaches a predetermined number of sheets, the processor 161 determines that the stored state of the sheets is not the cause of the sheet conveyance error.

In the embodiment described above, the processor 161 displays a visual guide on the display 110 when determining that the cause of the sheet conveyance error is the stored state of the sheets. However, the embodiment is not limited thereto. For example, when determining that the cause of the sheet conveyance error is the stored state of the sheets, the processor 161 may change the control parameters of the image forming apparatus 100 to alleviate the occurrence frequency of the sheet conveyance error. Specifically, the processor 161 may increase a conveyance time limit of the sheet to be conveyed. The conveyance time limit is a time limit during which a sheet is conveyed inside the image forming apparatus 100. If the conveyance of the sheet takes a time exceeding the conveyance time limit, the processor 161 determines that the sheet conveyance error occurs. The processor 161 may calculate the conveyance time limit based on a signal outputted from the conveyance sensor 151. The processor 161 may increase the conveyance time limit to not determine that the sheet conveyance error occurs even when the conveyance of the sheet is delayed, therefore preventing the occurrence of the sheet conveyance error.

In the embodiment described above, the image processing unit 130 is described as the printer 131 or the scanner 132. However, the image processing unit 130 of the embodiment is not limited to the printer 131 and the scanner 132. For example, the image processing unit 130 may be implemented using a decoloring device instead of the printer 131 and the scanner 132. The decoloring device decolors the image on the sheet formed with a decoloring toner. The decolored sheet can be reused.

While certain embodiments have been described, these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus comprising:

a sheet storage unit including a sheet tray on which one or more sheets are to be stacked;

a sensor configured to detect that the sheet storage unit is being operated; and a processor configured to execute a predetermined process after the sensor detects that the sheet storage unit is being operated and a predetermined condition relating to an occurrence frequency of a sheet conveyance error during a particular period is satisfied, wherein the processor is further configured to calculate the occurrence frequency every time the sheet conveyance error occurs or image forming is complete, and the predetermined condition is satisfied when the occurrence frequency differs from a predetermined occurrence frequency by more than a threshold.

2. The image forming apparatus according to claim 1, wherein the occurrence frequency is calculated from a total number of occurrences of the sheet conveyance error and a total number of sheets that have been fed from the sheet storage unit during the particular period.

3. The image forming apparatus according to claim 1, wherein the occurrence frequency is calculated from a total number of occurrences of the sheet conveyance error and a total number of printing jobs executed by the image forming apparatus during the particular period.

4. The image forming apparatus according to claim 1, wherein the processor is further configured to count a total number of copies printed by the image forming apparatus during the particular period to calculate the occurrence frequency.

5. The image forming apparatus according to claim 1, wherein the predetermined process is outputting an image illustrating that a state of the stored sheets is a cause of the sheet conveyance error.

6. The image forming apparatus according to claim 1, wherein the predetermined process alleviates an occurrence condition of the sheet conveyance error.

7. The image forming apparatus according to claim 6, wherein the processor is configured to increase a sheet conveyance time limit to alleviate the occurrence condition of the sheet conveyance error.

8. The image forming apparatus according to claim 1, wherein the predetermined condition is set differently depending on a characteristic of the sheets stored in the sheet storage unit.

9. The image forming apparatus according to claim 1, wherein the sheet storage unit includes first and second sheet storage units, each including the sensor, and the processor executes the predetermined process corresponding to one of the first and second sheet storage units regarding which the predetermined condition is satisfied.

10. A method of handling sheet conveyance errors in an image forming apparatus, the method comprising:

detecting a sheet conveyance error;

detecting an operation of a sheet storage unit in the image forming apparatus; and executing a predetermined process after the operation of the sheet storage unit is detected and a predetermined condition relating to an occurrence frequency of the sheet conveyance error during a particular period is satisfied, wherein the method further comprises calculating the occurrence frequency every time the sheet conveyance error is detected or image forming is complete, and the predetermined condition is satisfied when the occurrence frequency differs from a predetermined occurrence frequency by more than a threshold.

11. The method according to claim 10, wherein the occurrence frequency is calculated from a total number of occurrences of the sheet conveyance error and a total number of sheets that have been fed from the sheet storage unit during the particular period.

12. The method according to claim 10, wherein the occurrence frequency is calculated from a total number of occurrences of the sheet conveyance error and a total number of printing jobs executed by the image forming apparatus during the particular period.

13. The method according to claim 10, further comprising:

counting a total number of copies printed by the image forming apparatus during the particular period to calculate the occurrence frequency.

14. The method according to claim 10, wherein the predetermined process is outputting an image illustrating that a state of the stored sheets is a cause of the sheet conveyance error.

15. The method according to claim 10, wherein the predetermined process alleviates an occurrence condition of the sheet conveyance error.

16. The method according to claim 15, further comprising:

increasing a sheet conveyance time limit to alleviate the occurrence condition of the sheet conveyance error.

17. The method according to claim 10, wherein the predetermined condition is set differently depending on a characteristic of the sheets stored in the sheet storage unit.

18. The method according to claim 10, wherein the sheet storage unit includes first and second sheet storage units, each including the sensor, and the predetermined process is executed on one of the first and second sheet storage units regarding which the predetermined condition is satisfied.

19. An image forming apparatus comprising:

a sheet storage unit including a sheet tray on which one or more sheets are to be stacked;

a sensor configured to detect that the sheet storage unit is being operated; and a processor configured to execute a predetermined process after the sensor detects that the sheet storage unit is being operated and a predetermined condition relating to an occurrence frequency of a sheet conveyance error during a particular period is satisfied, wherein the processor is configured to calculate the occurrence frequency every time the sheet conveyance error occurs or image forming is complete, the predetermined process alleviates an occurrence condition of the sheet conveyance error, and the processor is configured to increase a sheet conveyance time limit to alleviate the occurrence condition of the sheet conveyance error.

* * * * *